April 5, 1932.  L. B. BOYD  1,852,105
PISTON
Filed Oct. 16, 1930
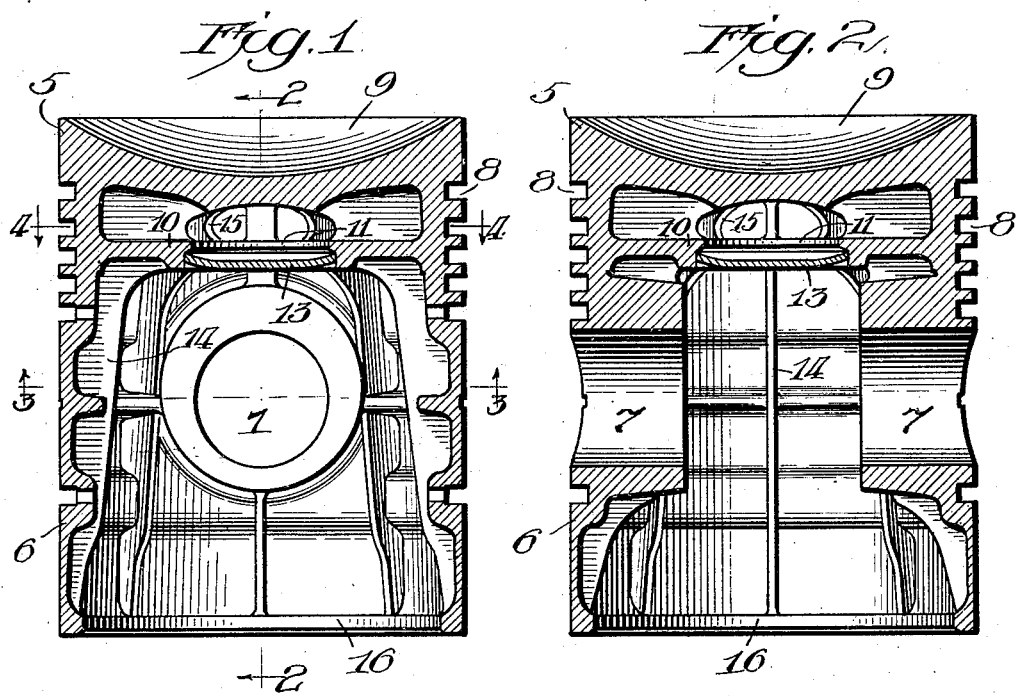
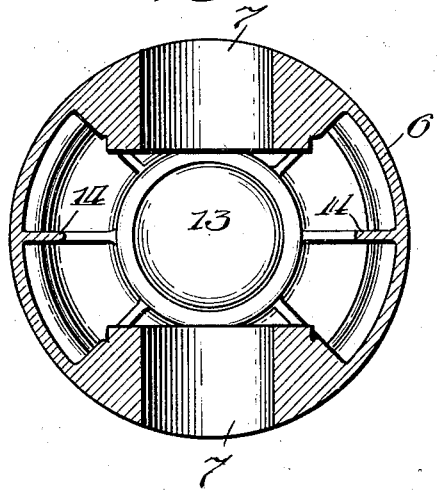
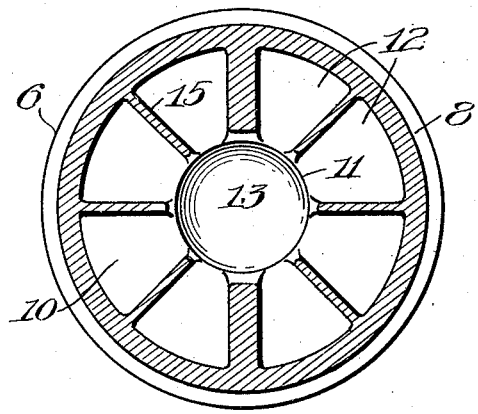
Inventor:
Landon B. Boyd
by Wm. O. Belt Atty Patented Apr. 5, 1932

1,852,105

UNITED STATES PATENT OFFICE

LANDON B. BOYD, OF LA PORTE, INDIANA, ASSIGNOR TO THE DE LUXE PRODUCTS CORPORATION, OF LA PORTE, INDIANA, A CORPORATION OF INDIANA

PISTON

Application filed October 16, 1930. Serial No. 489,021.

This invention relates to certain novel improvements in pistons and especially to pistons for use in engines wherein the temperatures in the explosion or expansion chamber are relatively high.

The salient objects of this invention are to provide a novel piston wherein the skirt and head will be effectively reenforced by ribs arranged interiorly of the piston; wherein a baffle will be provided below the head and efficiently insulated therefrom to prevent the lubricating oil from coming in contact with the head of the piston; wherein the insulation between the baffle and the head may be expeditiously provided; and which may be produced by a novel method that will expedite the attainment of the above objects.

A selected embodiment of the invention is illustrated in the accompanying drawings and therein Fig. 1 is a vertical sectional view of a piston embodying the invention;

Fig. 2 is a vertical sectional view taken substantially on the line 2—2 on Fig. 1;

Fig. 3 is a horizontal sectional view taken substantially on the line 3—3 on Fig. 1; and Fig. 4 is a horizontal sectional view taken substantially on the line 4—4 on Fig. 1.

The piston as disclosed in the accompanying drawings includes a head 5 and a skirt 6 in which wrist pin bearings 7, 7 are provided, the skirt and head being integral and preferably being cast. In the periphery of the skirt, spaced a short distance below the head 5, piston ring grooves 8, 8 are provided in which the usual piston rings are adapted to be mounted. The piston, as disclosed in the accompanying drawings, is particularly adapted for use in so-called Diesel engines and the head 5 may be cupped as indicated at 9 for the purpose well understood in that art. The explosion or expansion chamber temperatures of such engines is relatively high, and therefore the head of the piston becomes very hot during operation of the engine and if the lubricating oil, thrown into the piston, contacts with the head the lubricating properties thereof are destroyed, and to avoid this, the improved and novel piston of this invention embodies a baffle, arranged below the head, which prevents the lubricating oil from contacting with said head. The baffle in the present instance is arranged intermediate the head and the wrist pin bearings and is generally indicated by 10. The baffle is formed by a horizontal rib extended into the hollow interior of the piston from the skirt and at the center of this rib an opening 11 is provided. Arranged intermediate the baffle 10 and the head 5 are a plurality of openings 12, providing an air chamber. The openings are radially disposed and communicate with the opening 11. The method of producing this piston comprises the providing of a mold, in which cores to define the openings may be arranged. Molten metal is poured into the mold and after the metal has cooled sufficiently the piston is removed from the mold and by inserting a suitable implement through the opening 11 the cores may be broken and removed, to thus provide the air chamber below the head. After the cores have been removed the opening 11 is closed by arranging therein a so-called Welch or expansion plug, which is in the nature of a somewhat conical disc, and this disc is arranged in the opening 11 and a blow is struck thereon to flatten the same which tightly wedges the plug 13 in position, and thus the air chamber is sealed and a so-called dead air space is provided between the baffle and the head which effectively insulates said baffle from said head. Therefore the temperature of the baffle will be appreciably lower than the temperature of the head during the operation of an engine in which the piston is employed. By reason of the effective insulation thus provided it is possible to keep the temperature of the baffle below a point which will cause deterioration of the lubricating oil and thus the life of the lubricating oil may be prolonged.

The oil used in the lubrication of engines frequently becomes a fine spray or mist and when in this condition is thoroughly aerated. It has been mentioned that the heads of pistons in Diesel engines often become very hot and it sometimes happens that an oil mist, as above described, coming in contact with the hot head of such a piston, explodes. This is not a hypothetical condition but has been found to actually occur in many instances, and it is therefore manifest that the provision of the baffle 10 not only prolongs the life of the lubricating oil but also obviates such explosions, for the baffle 10 is so effectively insulated from the head that the temperature thereof will never reach a point sufficient to ignite an oil mist.

It is however not only advantageous to prevent the lubricating oil from contacting with the head of the piston but also to effectively reenforce the head of the piston as well as the skirt thereof. This reenforce is accomplished by providing vertical ribs interiorly of the skirt and below the head. Certain of these ribs, indicated by 14, extend between the lower end of the skirt and the baffle 10 while other of these ribs, indicated by 15, extend between the baffle 10 and the head 5. The respective ribs 14 and 15 are aligned with each other and are to all intents and purposes unitary continuously extending ribs, for the horizontal rib providing the baffle 10 is cast integrally with the head and skirt of the piston, as are the ribs 14 and 15. In order to prevent warping of the skirt, especially in the lower end thereof, an internally disposed flange 16 is provided. Each of the ribs 14 and 15 which, as stated, are in reality but one rib are preferably tapered on their inwardly disposed edges with the widest portions thereof arranged adjacent the head and with the narrower portions merging into the flange 16. This rib arrangement not only reenforces the skirt and head but also more effectively dissipates the heat, for it is manifest that the piston is hotter in portions thereof adjacent the head than in the portions thereof adjacent the skirt, and the ribs are so shaped that they are of greater width in the hotter portions to thus provide greater radiation surface.

It is manifest from the foregoing description that the novel piston of this invention is one wherein the head and skirt are effectively reenforced and wherein these parts are so reenforced that efficient heat radiating mediums are provided which are so distributed that warping of the piston, due to uneven expansion thereof by reason of an uneven distribution of heat, is eliminated. Moreover, the piston is so formed that the lubricating oil is prevented from contacting with the head of the piston, a baffle being provided for this purpose, which baffle is effectively insulated from the head and which may therefore be kept at a lower temperature than the temperature of the head.

The foregoing description sets forth a selected embodiment of the invention but it is to be understood that variations and modifications might be made therein and I therefore do not wish to be limited to the precise details set forth but desire to avail myself of such changes and alterations as fall within the purview of the following claims.

I claim:

1. A piston including a head and a skirt, a baffle in said skirt spaced from the head, radially disposed reenforcing means integral with the head, skirt and baffle and providing openings, said baffle having an opening therein communicating with said openings, and means for closing said opening to prevent communication to said openings.

2. A piston including a head and a skirt, a baffle in said skirt spaced from the head, reenforcing means between the baffle and the head and providing openings, said baffle having an opening therein communicating with said openings, means for closing said opening to prevent communication to said openings, and reenforcing means in said skirt aligned with said first named reenforcing means.

3. A piston including a head, a skirt, a rib in the skirt substantially parallel to and spaced from the head, and reenforcing ribs extending along said skirt from said head on both sides of said rib, said head, skirt, rib, and reenforcing ribs being integral.

4. A piston including a head, a skirt, a rib in the skirt substantially parallel to and spaced from the head, reenforcing ribs between said head and rib, and other reenforcing ribs between said rib and the end of said skirt and aligned with the first named reenforcing ribs, said head, skirt, rib, and reenforcing ribs being integral.

5. A piston including a head, a skirt, a rib in the skirt substantially parallel to and spaced from the head and having an opening therein, reenforcing ribs extending along said skirt on both sides of said rib and providing recesses between the head and rib communicating with the opening, and means for closing said opening to prevent communication with said recesses.

6. A piston including a head and a skirt, a baffle in said skirt spaced from the head, radially disposed ribs integral with and extending between the baffle and the head and defining openings, said baffle having an opening therein communicating with said openings, and an expansion plug in the opening in the baffle for closing said opening to prevent communication to said openings.

LANDON B. BOYD.